United States Patent
Chen

(10) Patent No.: US 8,578,958 B2
(45) Date of Patent: *Nov. 12, 2013

(54) LEAK MITIGATION FOR PRESSURIZED BI-DIRECTIONAL SYSTEMS

(75) Inventor: Shi Jung (Jerry) Chen, Orange, CA (US)

(73) Assignee: Quantum Fuel Systems Technologies Worldwide, Inc., Clinton Township, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/444,397

(22) Filed: Apr. 11, 2012

(65) Prior Publication Data

US 2012/0204975 A1 Aug. 16, 2012

Related U.S. Application Data

(63) Continuation of application No. 12/618,606, filed on Nov. 13, 2009, now Pat. No. 8,215,331.

(51) Int. Cl.
*G05D 16/00* (2006.01)

(52) U.S. Cl.
USPC ............ 137/115.13; 137/115.15; 137/115.25; 137/12; 137/14; 137/487.5

(58) Field of Classification Search
USPC .............. 137/12, 14, 115.13, 115.15, 115.25, 137/487.5
See application file for complete search history.

(56) References Cited

U.S. PATENT DOCUMENTS

| | | | |
|---|---|---|---|
| 5,367,999 A | 11/1994 | King | |
| 5,522,369 A | 6/1996 | Povinger | |
| 5,845,485 A * | 12/1998 | Murphy et al. | 60/274 |
| 6,363,959 B1 * | 4/2002 | Ollivier | 137/14 |
| 6,374,618 B1 * | 4/2002 | Lak | 62/50.1 |
| 6,869,707 B2 * | 3/2005 | Edlund et al. | 429/416 |
| 6,881,242 B2 * | 4/2005 | Krueger et al. | 95/56 |
| 6,971,399 B2 * | 12/2005 | Cowan | 137/209 |
| 6,994,927 B2 * | 2/2006 | Edlund et al. | 429/411 |
| 7,526,961 B2 * | 5/2009 | Downie et al. | 73/718 |
| 7,892,688 B2 * | 2/2011 | Takaku et al. | 429/442 |
| 8,215,331 B2 * | 7/2012 | Chen | 137/115.13 |
| 2004/0121218 A1 * | 6/2004 | Andrews | 429/38 |
| 2006/0027212 A1 | 2/2006 | Gardner et al. | |
| 2007/0031710 A1 * | 2/2007 | Ushio et al. | 429/25 |
| 2008/0248341 A1 * | 10/2008 | Matsumoto et al. | 429/13 |
| 2009/0162710 A1 * | 6/2009 | Kajiwara | 429/22 |
| 2010/0228399 A1 * | 9/2010 | Udischas et al. | 700/282 |
| 2010/0293927 A1 * | 11/2010 | Johannessen et al. | 60/295 |
| 2010/0319804 A1 * | 12/2010 | Moretti et al. | 141/1 |
| 2010/0326561 A1 * | 12/2010 | Moretti et al. | 141/4 |
| 2011/0041848 A1 * | 2/2011 | Stone et al. | 128/203.14 |

* cited by examiner

*Primary Examiner* — Eric Keasel
*Assistant Examiner* — Minh Le
(74) *Attorney, Agent, or Firm* — Baker Hostetler, LLP

(57) ABSTRACT

A bi-directional pressurized system with devices for and configured to mitigate issues associated with leak and creep phenomena at various stages throughout the system, including valves and controls to distribute a leaked amount of fluid prior to delivery to a pressure-sensitive destination and a pressure relief valve to bring an initial pressure within an acceptable range for distribution to reach a target pressure is disclosed. A startup method for mitigating leakage of the system during a rest phase, including selectively reducing the initial pressure upstream of a pressure-sensitive destination, is disclosed.

7 Claims, 6 Drawing Sheets

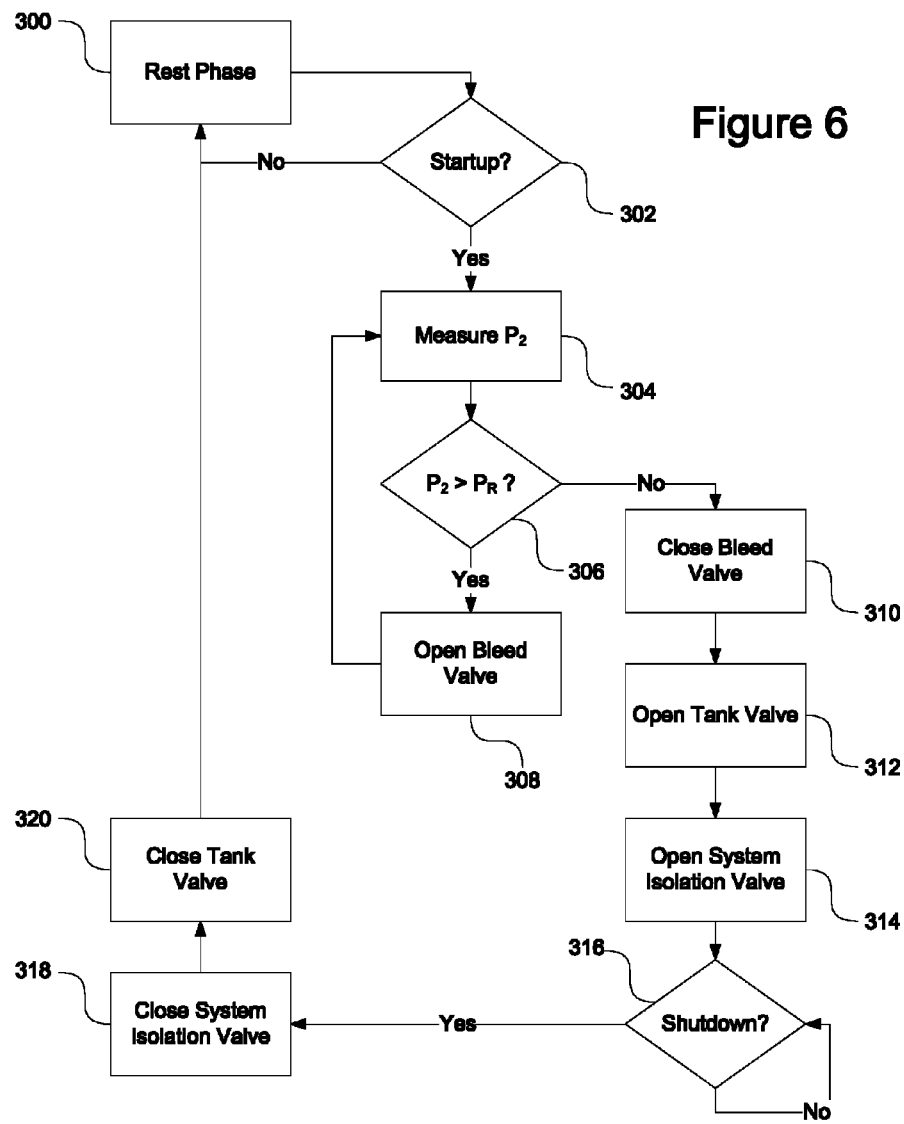

LEAK MITIGATION FOR PRESSURIZED BI-DIRECTIONAL SYSTEMS

RELATED APPLICATION

This application is a continuation of U.S. patent application Ser. No. 12/618,606, filed on Nov. 13, 2009 now U.S. Pat. No. 8,215,331. The entire disclosure of application Ser. No. 12/618,606 is incorporated herein by reference, as if fully set forth herein.

BACKGROUND

1. Field

The present disclosure relates to pressurized systems for storing and providing fluids. In particular, the present disclosure relates to mitigation of leaks and creep phenomena in pressurized gas systems.

SUMMARY

According to aspects of at least one exemplary implementation, a system for mitigating leaks is disclosed, comprising: a fluid source; an injector; a regulator disposed between the fluid source and the injector; a system isolation valve disposed between the regulator and the injector; a first line connecting the fluid source to the regulator; a second line connecting the regulator to the system isolation valve, the second line having a second volume; and a third line connecting the system isolation valve to the injector, the third line having a third volume. The combined second volume and third volume may be configured to reduce an initial pressure of a fluid in the first line to a distribution pressure when the system isolation valve is opened. The system isolation valve may be configured to open if the distribution pressure is equal to a target pressure for the injector.

According to aspects of at least one exemplary implementation, the system may further comprise a pressure relief valve configured to vent the fluid in the second line if the distribution pressure would be greater than the target pressure. The pressure relief valve may be further configured to reduce the pressure in the second line to not exceed a release pressure. The fluid source may be a storage tank having a tank valve. The fluid may be pure hydrogen. The injector may be disposed between the second line and a fuel cell. According to aspects of at least one exemplary implementation, the system may further comprise a low pressure sensor configured to sense the pressure in the second line.

According to aspects of at least one exemplary implementation, a startup method is disclosed for a pressurized system having a first line disposed between a tank valve of a storage tank and a regulator, comprising: sensing an initial pressure of a fluid in a second line having a second volume and disposed between a regulator and a system isolation valve, wherein the system isolation valve selectively connects the second line with a third line having a third volume and being disposed between the system isolation valve and an injector; calculating a distribution pressure; and if the distribution pressure is less than or equal to a target pressure, opening the system isolation valve, whereby the fluid in the second line is distributed across the second line and the third line and delivered to the injector at the target pressure.

According to aspects of at least one exemplary implementation, the startup method may further comprise: if the distribution pressure is greater than the target pressure, opening a bleed valve connected to the second line, whereby the fluid in the second line is at least partially vented. According to aspects of at least one exemplary implementation, the startup method may further comprise: opening the tank valve.

According to aspects of at least one exemplary implementation, a startup method is disclosed for mitigating leaks in a pressurized system having a first line disposed between a tank valve of a storage tank and a regulator, comprising: sensing an initial pressure of a fluid in a second line having a second volume and disposed between a regulator and a system isolation valve, wherein the system isolation valve selectively connects the second line with a third line having a third volume and being disposed between the system isolation valve and an injector; if the pressure in the second line is greater than a release pressure, connecting the second line to a pressure relief valve, whereby the pressure in the second line is reduced to the release pressure; and if the pressure in the second line is less than or equal to the release pressure, opening the system isolation valve, whereby the fluid in the second line is distributed across the second line and the third line and delivered to the injector at a target pressure.

According to aspects of at least one exemplary implementation, connecting the second line to a pressure relief valve may further comprise: opening a bleed valve. The connecting step may further comprise: closing the bleed when the pressure in the second line is substantially equal to the release pressure. A pressure differential across the tank valve may be reduced prior to opening the tank valve. A pressure differential across the system isolation valve may be reduced prior to opening the system isolation valve.

DRAWINGS

The above-mentioned features and objects of the present disclosure will become more apparent with reference to the following description taken in conjunction with the accompanying drawings wherein like reference numerals denote like elements and in which:

FIG. 6 shows a flow chart of a startup process for a pressurized system.

DETAILED DESCRIPTION

Traditionally, regulators are not effective as sealing devices. A regulator's function is to control its downstream pressure in a flow condition. At no flow, the upstream pressure will gradually leak through the internal seat, resulting in a decrease of upstream pressure and an increase of downstream pressure. This phenomenon is known as "creep." Furthermore, regulators having more precise output regulation (e.g., +/−0.1 Mpa) make the creep phenomena more significant, particularly where additional components downstream of a regulator require pressure variation to be within a precise range for proper operation.

Figure 1:
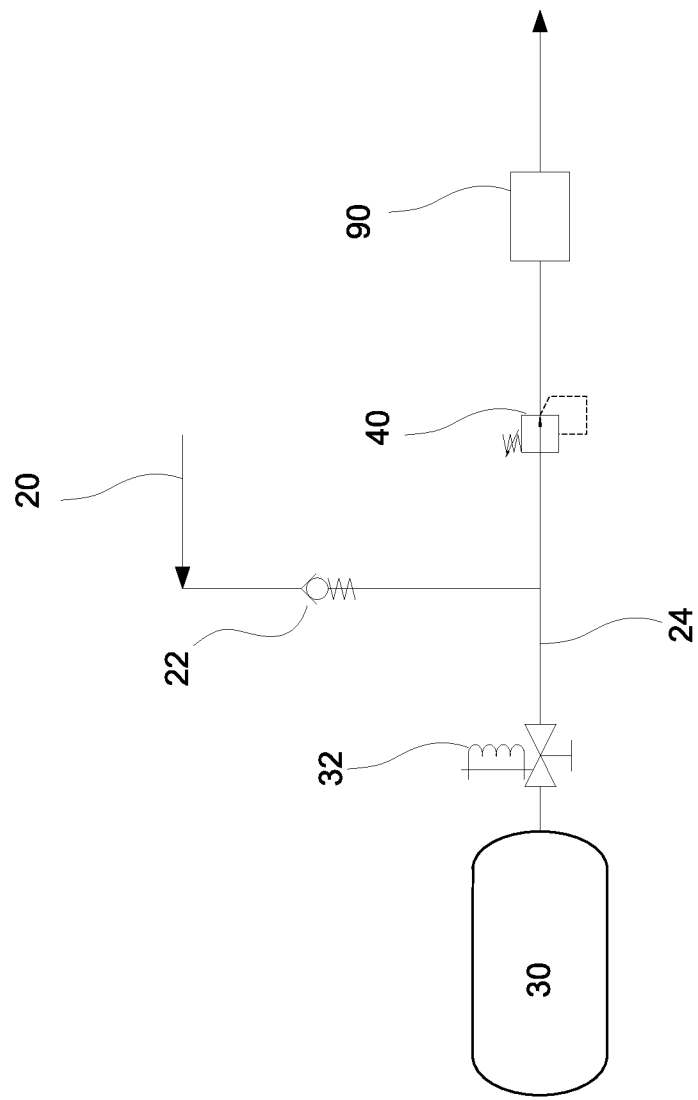
FIG. 1 shows a schematic diagram of a traditional bi-directional system.

FIG. 1 shows a traditional bi-directional mechanization for a hydrogen storage system. Fill line 20 provides a fluid (gas or liquid) through check valve 22 to a point that diverts into two directions along spending line 24: one direction to storage tank 30 and another direction to regulator 40. This bi-directional mechanization has multiple advantages. For example, redundant tubing is avoided inasmuch as portions of spending line 24 are the same as portions of fill line 20. Thus, this mechanization provides minimal tubing connections and minimal joints for external leak.

Figure 2:
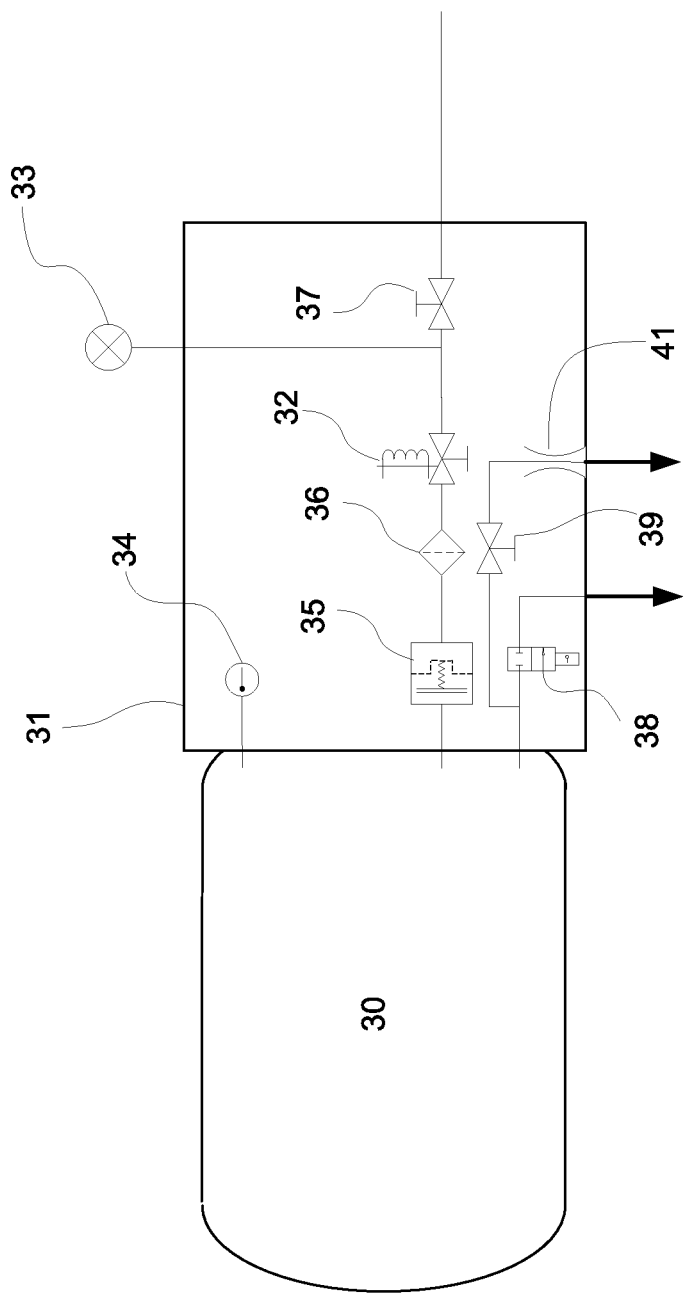
FIG. 2 shows a schematic diagram of a storage tank with an active on tank device.

According to aspects of at least one exemplary implementation, storage tank 30 is provided with appropriate control and regulation devices to manage the flow and conditions of fluid of storage tank 30. For example, tank valve 32 may be provided at the entrance and exit line of storage tank 30. Tank valve 32 may be a solenoid valve, a manual valve, an air activated valve, or other valve to selectively control flow in and out of storage tank 30. According to aspects of at least one exemplary implementation, tank valve 32 may be part of a broader system for managing storage tank 30. For example, as shown in FIG. 2, active on tank device 31 of storage tank 30 may include temperature sensor 34, pressure sensor 33, excess flow valve 35, filter 36, manual valve 37, tank valve 32, thermal pressure relief device 38, defueling valve 39, orifice 41, and appropriate inlets and outlets.

According to aspects of at least one exemplary implementation, regulator 40 may be provided between storage tank 30 and the destination, such as injector 90 or other component that receives a flow of the fluid from storage tank 30, as shown in FIG. 1. For example, single stage regulator 40 may be provided. Regulator 40 may be configured to reduce any upstream pressure from storage tank 30 to within an acceptable range with tolerances (i.e., a target pressure). For example, regulator 40 may be configured to reduce the downstream pressure to 0.9 MPa (g)+/−0.1. The acceptable range with tolerances may correspond to limitations imposed by an intermediate or ultimate destination of the fluid. One or more devices at or downstream of a destination of a system may be sensitive to pressure. For example, regulator 40 may be configured to manage downstream pressure to injector 90, which may only be configured to receive fluid within certain pressure conditions without sustaining undesirable damage. Without adequate accommodation, leakage from tank valve 32 or regulator 40 may cause an undesirable pressure load to be delivered to the destination.

According to aspects of at least one exemplary implementation, devices and configurations for managing the downstream pressure to the destination may be managed to mitigate leaks at tank valve 32 or regulator 40 stage of the system.

Figure 3:
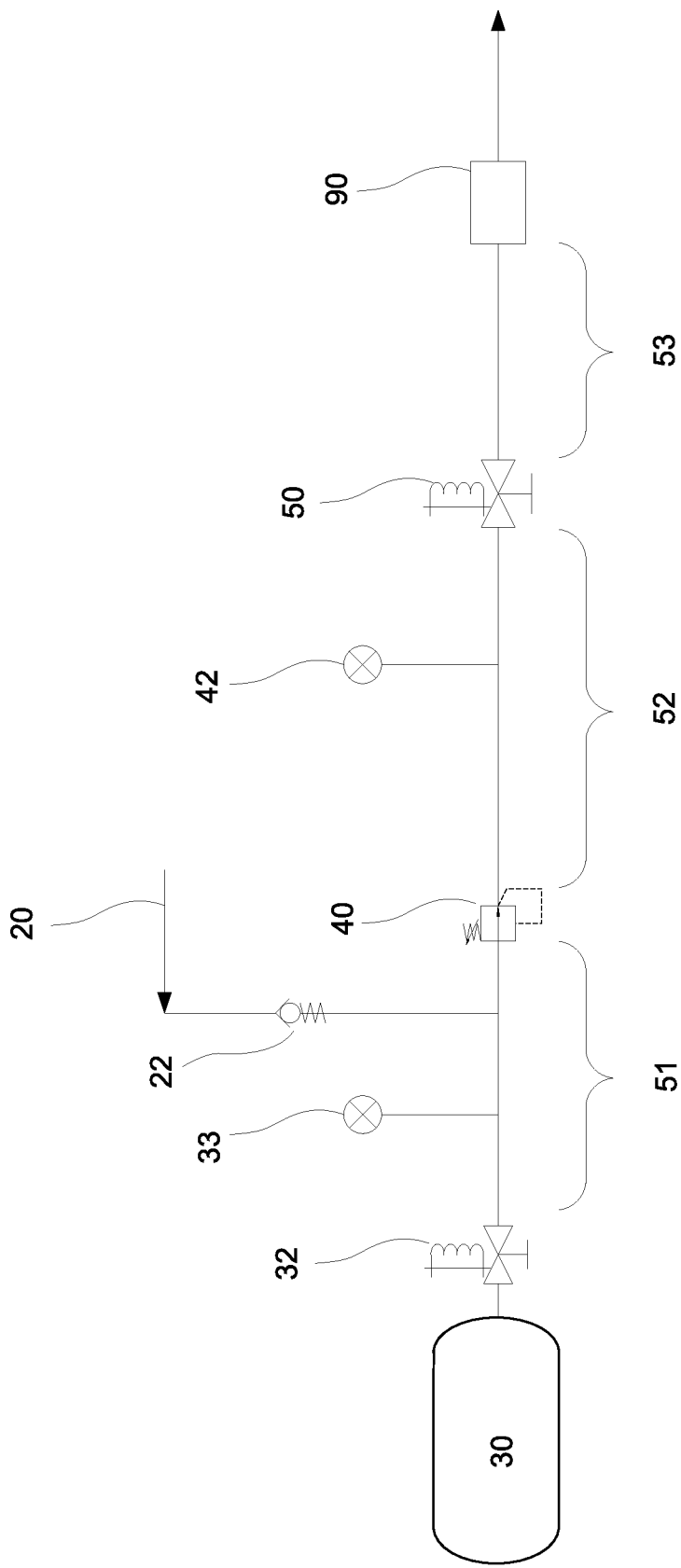
FIG. 3 shows a schematic diagram of a bi-directional pressurized system.

According to aspects of at least one exemplary implementation, a bi-directional system is shown in FIG. 3. System isolation valve 50 may be provided between regulator 40 and the destination (e.g., injector 90), as shown in FIG. 3. System isolation valve 50 may be a solenoid valve that can be open at very low electrical power (i.e., because the pressure load is as low as 0.9 Mpa (g) nominal). Upon initiation of the system, system isolation valve 50 may open and provide its upstream flow from regulator 40 to the destination.

According to aspects of at least one exemplary implementation, creep at regulator 40 will provide an initially excessive upstream pressure to system isolation valve 50. For example, first line 51 may be defined as the connection between tank valve 32 and regulator 40. Second line 52 may be defined as the connection between regulator 40 and system isolation valve 50. Creep at regulator 40 occurring while tank valve 32 and system isolation valve 50 are closed will eventually cause the pressure between in first line 51 (upstream to regulator 40) to balance with the pressure in second line 52 (downstream to regulator 40). This may present an excessive pressure condition to the destination when system isolation valve 50 is opened. If system isolation valve 50 opens, downstream injector 90 will receive higher pressure impulse. Such a high pressure impulse may cause injector 90 to leak, which may be particularly dangerous if the fluid leaked is volatile. Moreover, the operation life of injector 90 may be shortened due to these high pressure conditions. Furthermore, system isolation valve 50 and injector 90 would require more power to overcome the increase pressure differential due to regulator creep.

According to aspects of at least one exemplary implementation, a volumetric solution is provided to provide an acceptable pressure to the destination of a system, even after an occurrence of regulator creep. This solution is based on the isothermal balance of the fluid.

According to aspects of at least one exemplary implementation, first line 51 is provided between tank valve 32 and regulator 40. First line 51 has a first volume ($V_1$) and first pressure ($P_1$) therein. According to aspects of at least one exemplary implementation, second line 52 is provided between regulator 40 and system isolation valve 50. Second line 52 has a second volume ($V_2$) and second pressure ($P_2$) therein. According to aspects of at least one exemplary implementation, third line 53 is provided between system isolation valve 50 and injector 90 (or other destination device). Third line 53 has a third volume ($V_3$) and third pressure ($P_3$) therein.

According to aspects of at least one exemplary implementation, a target pressure ($P_T$) may be defined as an acceptable pressure to be provided to injector 90. According to aspects of at least one exemplary implementation, the system has an initial state at or before the time system isolation valve 50 is opened. In the initial state, the second pressure results from the existence of any regulator creep leading up to the time of the initial state. The third pressure may be equal to or substantially equal to zero, because prior cycles would deplete the amount of fluid in third line 53 after system isolation valve 50 is closed.

According to aspects of at least one exemplary implementation, when system isolation valve 50 is opened, the fluid in second line 52 will be distributed across second line 52 and third line 53. Accordingly, a distribution pressure ($P_D$) may be defined as the pressure resulting from the substantially even distribution of the fluid in second line 52 across the combined volume of second line 52 and third line 53 ($V_2+V_3$) at the time system isolation valve 50 is opened.

According to Boyle's law, pressure multiplied by volume and divided by temperature in the first state will be equal to pressure multiplied by volume and divided by temperature in the second state. This may be expressed as:

$$(P_A * V_A)/T_A = (P_B * V_B)/T_B \quad \text{(Formula 1)}.$$

Where temperature remains substantially constant across both states, this reduces to:

$$(P_A * V_A) = (P_B * V_B) \quad \text{(Formula 2)}.$$

Thus, the pressure and volumes of a system during a state prior to the opening of system isolation valve 50 as compared to a state after opening system isolation valve 50 may be expressed as:

$$(P_2 * V_2) + (P_3 * V_3) = P_D * (V_2 + V_3) \quad \text{(Formula 3)}.$$

Where the third pressure is equal to zero, this reduces to:

$$(P_2 * V_2) = P_D * (V_2 + V_3) \quad \text{(Formula 4)}.$$

To determine what the distributed pressure will be once system isolation valve 50 is opened, Formula 4 may be rearranged and expressed as:

$$P_D = (P_2 * V_2)/(V_2 + V_3) \quad \text{(Formula 5)}.$$

According to aspects of at least one exemplary implementation, the system may be configured with known dimensions and parameters. Furthermore, the pressure in second line 52 may be measured by low pressure sensor 42 located at second line 52. The known dimensions of the system and the measured pressure allow a distribution pressure to be calculated according to Formula 5.

Figure 4:
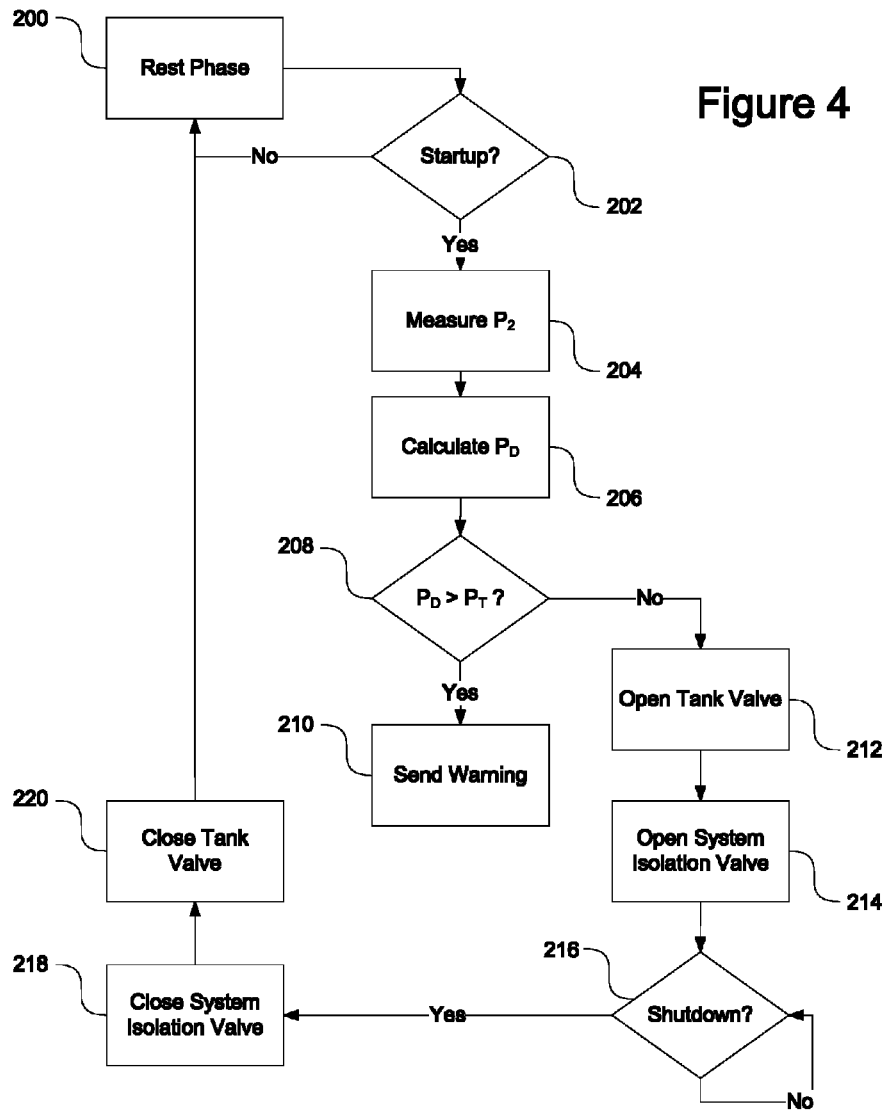
FIG. 4 shows a flow chart of a startup process for a pressurized system.

According to aspects of at least one exemplary implementation, a startup phase as shown in FIG. 4 may be performed. Tank valve 32 and system isolation valve 50 may be closed while the system is at rest in a rest phase (operation 200). During this rest phase, the pressure in second line 52 may increase due to regulator creep, but the pressure may be contained while system isolation valve 50 is closed. When a startup command is received, a startup phase may be initiated (operation 202). The pressure in second line 52 may be measured (e.g., by a low pressure sensor 42 (operation 204). With the measured pressure in second line 52 and know values for the volumes of second line 52 and third line 53, a distribution pressure may be calculated, for example with Formula 5 (operation 206). If the distribution pressure exceeds the target pressure, then system isolation valve 50 may remain closed until corrective measures are taken (operation 208). A warning or other indication may be sent to an operator or another system (operation 210). If the distribution pressure does not exceed the target pressure, then tank valve 32 and system isolation valve 50 may be opened (operations 212 and 214). While fluid flows from storage tank 30 to injector 90, the system may maintain a steady state phase of operation. When a shutdown command is received, at least one of system isolation valve 50 and tank valve 32 may be closed, if needed. (operations 216, 218, and 220).

Figure 5:
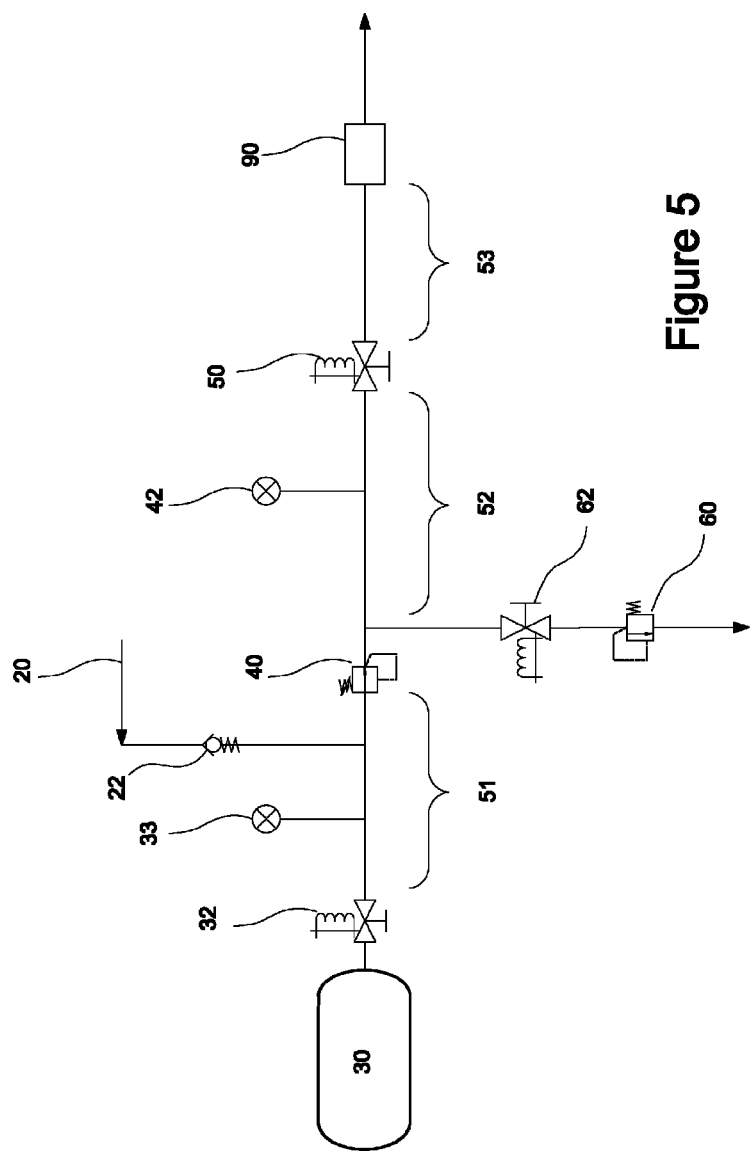
FIG. 5 shows a schematic diagram of a pressurized system.

According to aspects of at least one exemplary implementation, a bi-directional system is shown in FIG. 5. Devices for relieving excessive pressure may be provided. For example, as shown in FIG. 5, pressure relief valve 60 may be provided in fluid communication with second line 52. Pressure relief valve 60 may be a pressure responsive valve, such as a valve that only conducts fluid when its upstream pressure reaches a certain threshold. The pressure threshold for activation of pressure relief valve 60 is disclosed further herein, according to aspects of at least one exemplary implementation.

According to aspects of at least one exemplary implementation, system isolation valve 50 and pressure relief valve 60 may operate together to mitigate pressure of the system. The activation pressure of pressure relief valve 60 may be the pressure at which a calculated distribution pressure exceeds the target pressure of the destination device. For example, where the distribution of the fluid in second line 52 across second line 52 and third line 53 by opening system isolation valve 50 is still insufficient to achieve the target pressure, then it can be said that the hypothetical distribution pressure is greater than the target pressure. Pressure relief valve 60 may be configured to become activated under such conditions so that the pressure in second line 52 is reduced and the hypothetical distribution pressure is equal to or less than the target pressure.

According to aspects of at least one exemplary implementation, the volumes of second line 52 and first line 51 may be selected to correspond to the activation pressure of pressure relief valve 60. This is the scenario in which the distribution pressure is the target pressure, thus Formula 3 may be rearranged and expressed as:

$$V_3/V_2 = (P_P - P_2)/(P_3 - P_D) \qquad \text{(Formula 6).}$$

According to aspects of at least one exemplary implementation, the pressure at which pressure relief valve 60 becomes activated may be defined as the release pressure ($P_R$). The release pressure may correspond to the pressure in second line 52 while system isolation valve 50 is closed, at which pressure the calculated distribution pressure would equal the target pressure. The release pressure may be determined and adjusted based on physical characteristics of pressure relief valve 60. With this configuration, pressure relief valve 60 may reduce the pressure in second line 52 such that the distribution pressure does not exceed the target pressure when system isolation valve 50 is opened. With this, Formula 6 may be expressed as:

$$V_3/V_2 = (P_D - P_R)/(P_3 - P_D) \qquad \text{(Formula 7).}$$

For example, pressure relief valve 60 may be configured to become activated at $P_R$=1.6 Mpa(g), as measured in second line 52; the target pressure desired for the distribution pressure to achieve may be $P_P$=0.9 Mpa(g); and the pressure in third line 53 may be $P_3$=0 while system isolation valve 50 is closed. Under these conditions, the ratio of $V_3/V_2$ is calculated as 0.77 based on Formula 7. Thus, with second line 52 and third line 53 having this ratio, pressures in second line 52 exceeding 1.6 Mpa(g) will be released through pressure relief valve 60. Furthermore, pressures in second line 52 not exceeding 1.6 Mpa(g) will be distributed across second line 52 and third line 53 when system isolation valve 50 opens, and the distribution pressure will not exceed the target pressure. In this way, pressure relief valve 60 and system isolation valve 50 may operate together to ensure that the pressure to the destination device does not exceed the target pressure.

According to aspects of at least one exemplary implementation, for automatic operation, bleed valve 62 may be provided upstream of pressure relief valve 60 or otherwise disposed between regulator 40 and pressure relief valve 60. Bleed valve 62 may be a solenoid valve, manual valve, or other valve having "open" and "closed" states. In some applications, particularly in a vehicle with tight spaces, a manual valve may be less desirable because of the tight space; thus other valves, such as a solenoid valve, may be provided. According to aspects of at least one exemplary implementation, bleed valve 62 may address issues relating to continual leakage through regulator 40 and release by pressure relief valve 60. For example, while system isolation valve 50 is closed, regulator 40 may experience creep there through. Where pressure relief valve 60 is provided, the pressure in second line 52 may be constantly reduced to the release pressure.

According to aspects of at least one exemplary implementation, release of fluid through pressure relief valve 60 may be continual, planned, programmed, scheduled, controlled, variable, or otherwise configurable. In some instances, some fluids may be flammable and introduce a risk of fire. The pressure in first line 51 may be reduced to the release pressure if pressure relief valve 60 is permitted to operate continually. Where the release pressure is low relative to the pressure in storage tank 30, this causes a high differential across tank valve 32, thereby increasing the energy requirement for opening tank valve 32. Furthermore, the fluid may be vented through pressure relief valve 60 to an unrecoverable state, such as into the atmosphere or surrounding environment. Where the fluid is a fuel, this decreases fuel efficiency.

According to aspects of at least one exemplary implementation, a startup phase as shown in FIG. 6 may be performed. Bleed valve 62 may be closed while system isolation valve 50 is closed and the system is at rest in a rest phase (operation 300). During this rest phase, the pressure in second line 52 may increase due to regulator creep, but the pressure may be contained while system isolation valve 50 and bleed valve 62 are closed. When a startup command is received, a startup phase may be initiated (operation 302). The pressure in second line 52 may be measured (e.g., by a low pressure sensor 42) (operation 304). If the pressure in second line 52 exceeds the release pressure, bleed valve 62 may be opened prior to system isolation valve 50, whereby the pressure in second line 52 is reduced to the release pressure by pressure relief valve 60 (operations 306 and 308). Low pressure sensor 42 may verify that second line 52 has achieved the release pressure. When the pressure in second line 52 does not exceed the release pressure, one or more of the following may be performed: closing bleed valve 62, opening tank valve 32, and opening system isolation valve 50 (operations 310, 312, and 314). While fluid flows from storage tank 30 to injector 90, the system may maintain a steady state phase of operation. When a shutdown command is received, at least one of system isolation valve 50, tank valve 32, and bleed valve 62 may be closed, if needed (operations 316, 318, and 320).

According to aspects of at least one exemplary implementation, maintaining bleed valve 62 in a closed state during a rest phase reduces the amount of fluid that may be lost if pressure relief valve 60 is active during a rest phase. Without bleed valve 62, tank valve 32 and regulator 40 may both leak, whereby the fluid in storage tank 30 may continuously feed to first line 51 and second line 52. Given sufficient time, storage tank 30 may entirely empty through pressure relief valve 60. Regulator 40 may better maintain a seal to substantially or completely limit creep where the downstream pressure is high. Where bleed valve 62 maintains any pressure within second line 52, regulator 40 may experience limited and improved creep phenomena. The fluid maintained in at least second line 52 may be preserved for later use by the system, rather than lost to unintended leakage. Furthermore, the release of fluid during a startup phase in excess of the release pressure occurs within a known period of time and location, thereby allowing the system or user to make adequate accommodations.

According to aspects of at least one exemplary implementation, the energy requirement for opening tank valve 32 is reduced. For example, the pressure in first line 51 is maintained by preventing pressure relief valve 60 to vent the fluid leaked via regulator creep. Where the volume of first line 51 is large in comparison to the volume of second line 52, the leak of fluid via regulator creep may not significantly reduce the pressure in first line 51 as long as second line 52 is contained by system isolation valve 50 and bleed valve 62. Thus, the energy requirement for opening tank valve 32 may be reduced because the pressure downstream (i.e., in first line 51) of tank valve 32 is substantially similar to the pressure upstream (i.e., from storage tank 30).

According to aspects of at least one exemplary implementation, the energy requirement for opening system isolation valve 50 is also reduced. Because the pressure in second line 52 may be reduced to the release pressure, as disclosed herein, the pressure upstream of system isolation valve 50 (i.e., in second line 52) is brought closer to the pressure downstream of system isolation valve 50 (i.e., in third line 53, which pressure may be zero).

According to aspects of at least one exemplary implementation, systems and methods of the present disclosure may mitigate issues relating to leak of both regulator 40 and tank valve 32. As disclosed herein, when system isolation valve 50 and bleed valve 62 are closed, the fluid within second line 52 may be contained. Thus, undesirable loss through pressure relief valve 60 during a rest phase may be avoided even where both regulator 40 and tank valve 32 leak the fluid from storage tank 30 into second line 52.

According to aspects of at least one exemplary implementation, reducing the energy requirements during operation of one or more valves of a system may improve energy efficiency of the system. Furthermore, reducing creep resistance requirements of one or more regulators may improve cost efficiency by allowing implementation of devices that are not entirely creep resistant.

According to aspects of at least one exemplary implementation, bleed valve 62 may be configured to be capable of opening under a maximum differential pressure occurring within the system. For example, bleed valve 62 may be capable of opening at a differential equal to a maximum fill pressure of storage tank 30. Bleed valve 62 may be provided with a current drive as needed to operate under such conditions.

According to aspects of at least one exemplary implementation, system isolation valve 50 may be configured to selectively contain at least maximum upstream pressure corresponding to the maximum pressure occurring within the system. For example, system isolation valve 50 may be capable of containing an upstream pressure equal to a maximum fill pressure of storage tank 30. System isolation valve 50 may further be configured to open at the release pressure.

According to aspects of at least one exemplary implementation, pressure sensors of the system, such as high pressure sensor 33 or low pressure sensor 42, may be configured to operate and sustain the maximum pressure occurring with the system (e.g., a maximum fill pressure of storage tank 30).

According to aspects of at least one exemplary implementation, adequate control systems and devices may be provided in connection with relevant components to monitor the system, control operation thereof, and interface with a user or other systems. Such control systems may store, process, and communicate operation parameters, commands, data, and information relating to the system.

According to aspects of at least one exemplary implementation, any given device or component of the present disclosure may be provided in plurality through the system. For example, multiple valves, etc. may be provided in series or parallel to provide customizable results. By further example, multiple storage tanks 30 may be provided and connected to a common line leading to a destination, as shown in Appendix A, the entirety of which is incorporated by reference, as if fully set forth herein.

According to aspects of at least one exemplary implementation, where pressures are disclosed herein, such pressures may represent absolute pressure values or pressure values relative to a reference point, such as atmospheric pressure, as those skilled in the art will recognize.

Aspects of exemplary implementations disclosed herein are intended to be capable of combination, separation, and exchange with other aspects of exemplary implementations disclosed herein, except where expressly stated otherwise.

While the method and apparatus have been described in terms of what are presently considered to be the most practical and preferred exemplary implementations, it is to be understood that the disclosure need not be limited to the disclosed exemplary implementations. It is intended to cover various modifications and similar arrangements included within the spirit and scope of the claims, the scope of which should be accorded the broadest interpretation so as to encompass all such modifications and similar structures. The present disclosure includes any and all exemplary implementations of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an exemplary implementation of any apparatus exemplary implementation, a method or process exemplary implementation, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

What is claimed is:

1. A system for mitigating leaks, comprising:
a fluid source;
an injector;
a regulator disposed between the fluid source and the injector;
a system isolation valve disposed between the regulator and the injector;
a first line connecting the fluid source to the regulator;
a second line connecting the regulator to the system isolation valve, the second line having a second volume;
a bleed valve fluidly connecting a pressure relief valve to the second line;
a third line connecting the system isolation valve to the injector, the third line having a third volume;
wherein the combined second volume and third volume is configured to reduce an initial pressure of a fluid in the first line to a distribution pressure when the system isolation valve is opened;
wherein the system isolation valve is configured to open if the distribution pressure is equal to a target pressure for the injector; and,
wherein the pressure relief valve is configured to vent the fluid in the second line if the bleed valve is open.

2. The system of claim 1, wherein the fluid source is a storage tank having a tank valve.

3. The system of claim 1, wherein the distribution pressure is defined as a pressure resulting from a substantially even distribution of the fluid in the second line across the combined volume of the second line and the third line.

4. The system of claim 1, wherein the injector is disposed between the second line and a fuel cell.

5. The system of claim 1, further comprising a low pressure sensor configured to sense the pressure in the second line.

6. A system for mitigating leaks, comprising:
a fluid source;
an injector;
a regulator disposed between the fluid source and the injector;
a system isolation valve disposed between the regulator and the injector;
a first line connecting the fluid source to the regulator;
a second line connecting the regulator to the system isolation valve, the second line having a second volume;
a bleed valve fluidly connecting a pressure relief valve to the second line;
a third line connecting the system isolation valve to the injector, the third line having a third volume;
wherein the pressure relief valve is configured to release pressure in the second line, based upon a ratio of the second volume to the third volume, if the pressure exceeds a predetermined value; and
wherein the pressure relief valve is configured to vent the fluid in the second line if the bleed valve is open.

7. A system for mitigating leaks, comprising:
a fluid source;
an injector;

a regulator disposed between the fluid source and the injector;

a system isolation valve disposed between the regulator and the injector;

a first line connecting the fluid source to the regulator;

a second line connecting the regulator to the system isolation valve, the second line having a second volume;

a bleed valve fluidly connecting a pressure relief valve to the second line;

a third line connecting the system isolation valve to the injector, the third line having a third volume; and wherein the system isolation valve is configured to open and distribute pressure in the second line, based upon a ratio of the second volume to the third volume, across the second line and third line when the pressure in the second line is less than a predetermined value.

* * * * *